Sept. 13, 1960 W. L. VEATCH 2,952,070
WROUGHT FITTING AND METHOD OF MAKING
Filed July 1, 1955 4 Sheets-Sheet 1
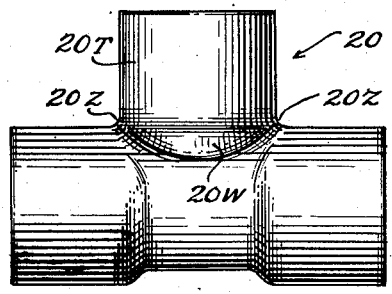
Fig. 1.
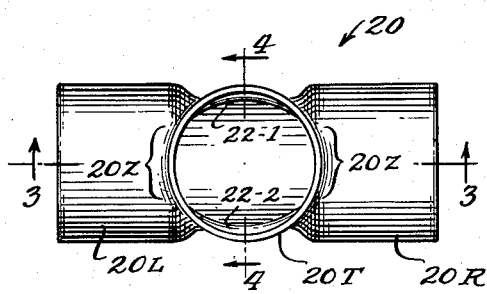
Fig. 2.
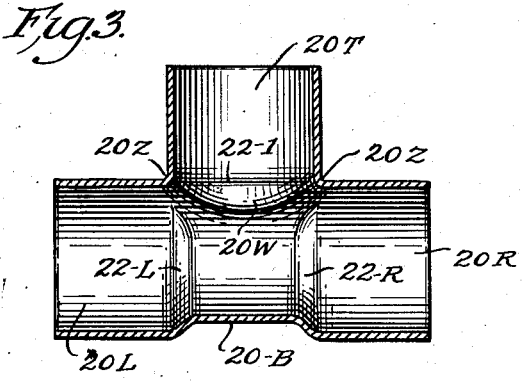
Fig. 3.
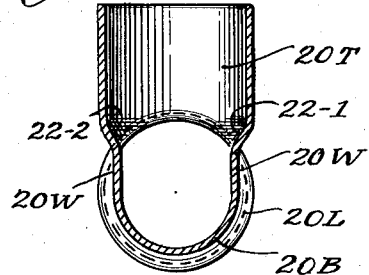
Fig. 4.
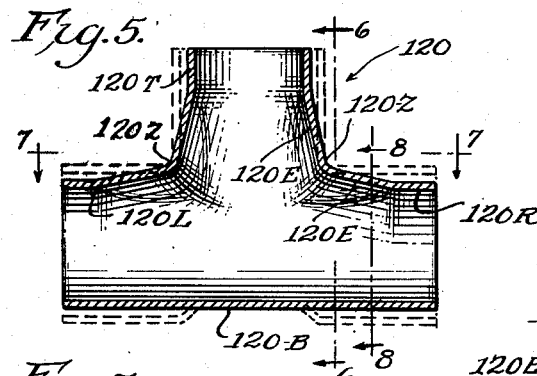
Fig. 5.
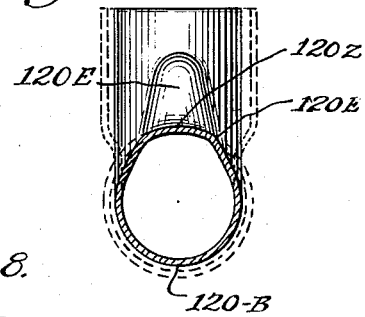
Fig. 6.
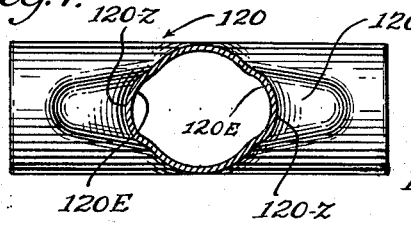
Fig. 7.
Fig. 8.
Inventor
Walter L. Veatch
By Mann, Brown and Hanemann
Attys.

Sept. 13, 1960 W. L. VEATCH 2,952,070
WROUGHT FITTING AND METHOD OF MAKING
Filed July 1, 1955 4 Sheets-Sheet 2
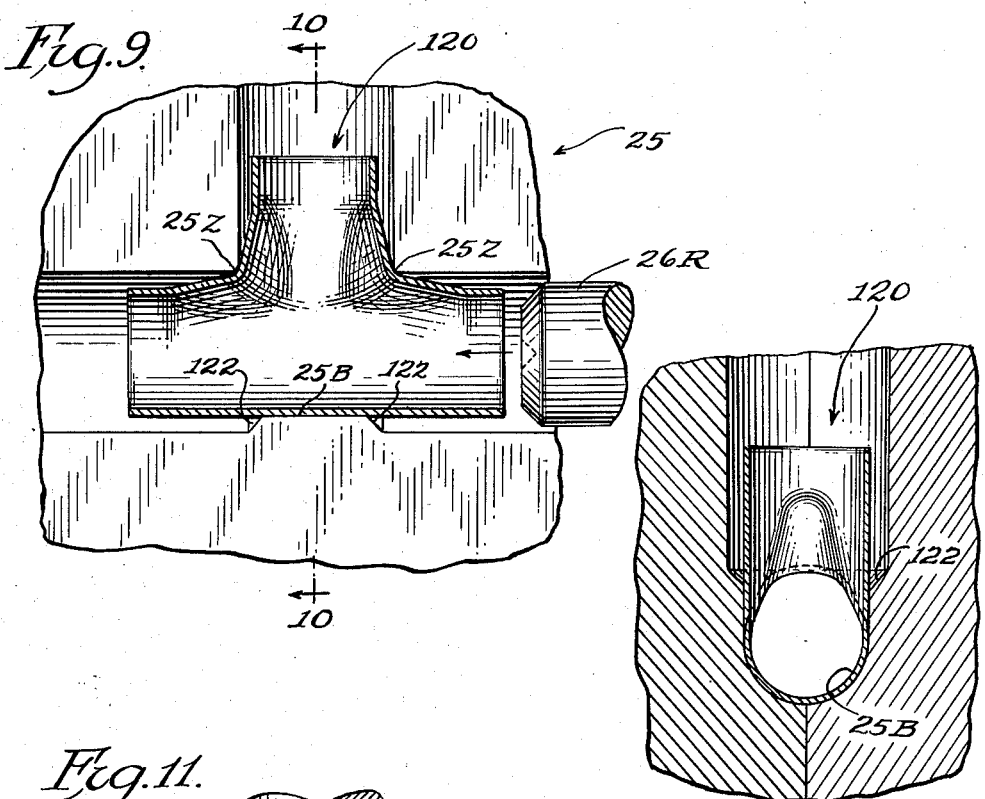
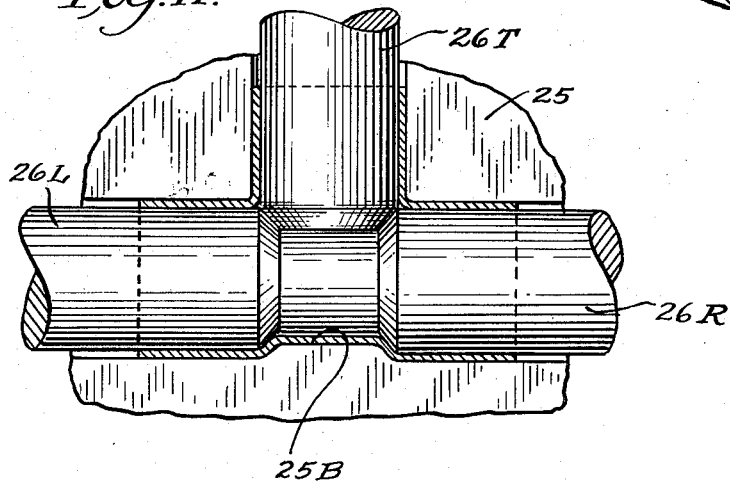
Inventor
Walter L. Veatch
By
Mann, Brown and Hansmann
Attys.

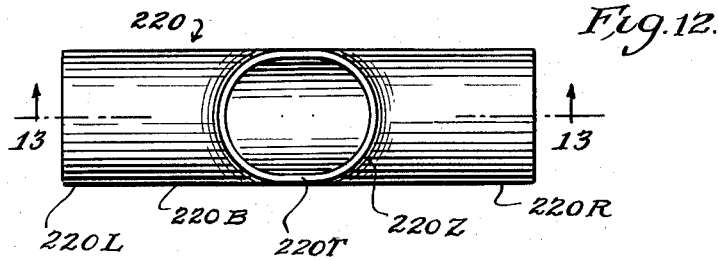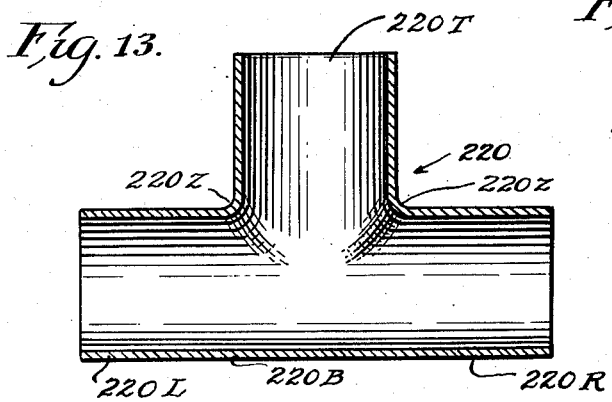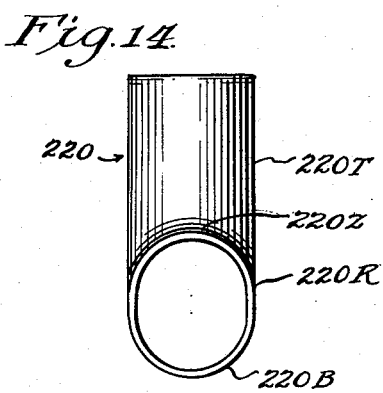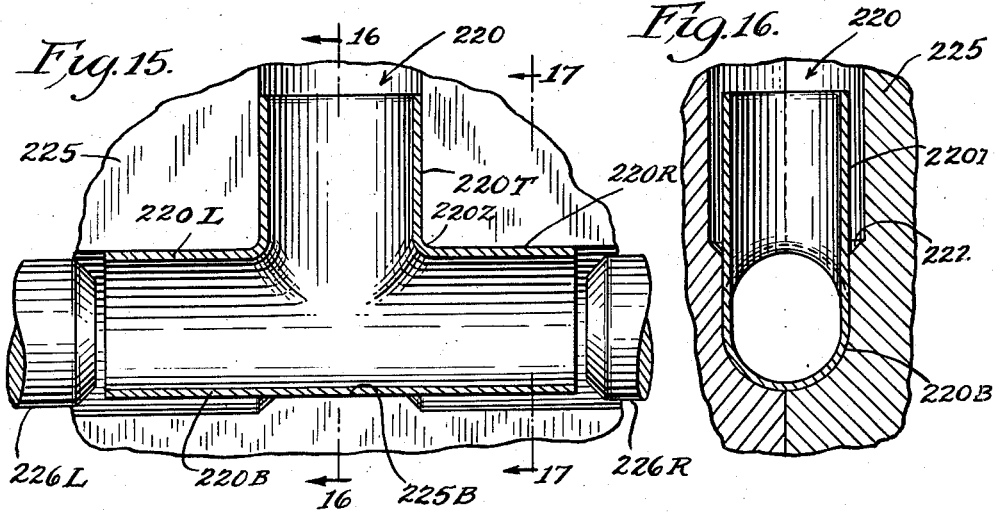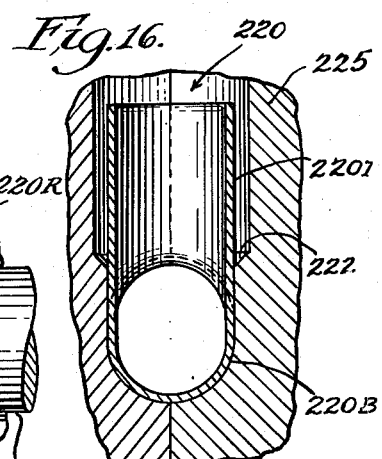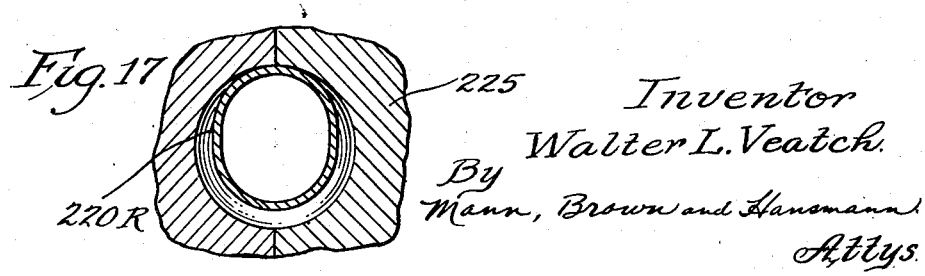

Sept. 13, 1960 W. L. VEATCH 2,952,070
WROUGHT FITTING AND METHOD OF MAKING
Filed July 1, 1955 4 Sheets-Sheet 4
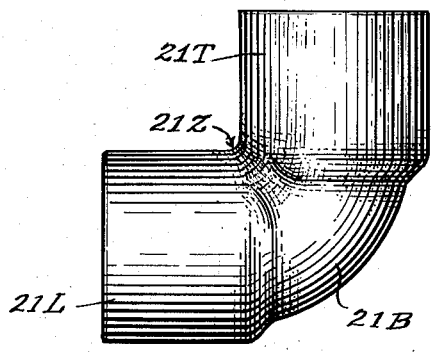
Fig. 18.
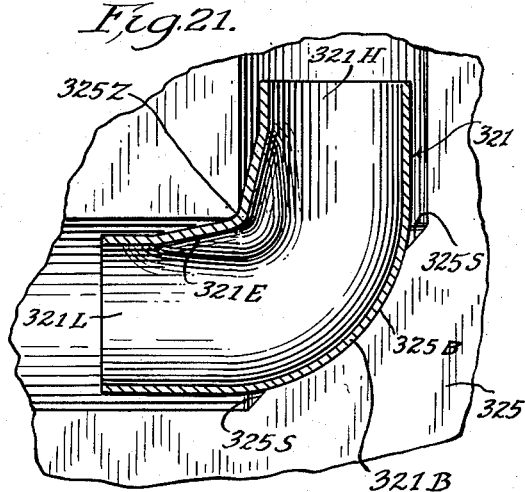
Fig. 21.
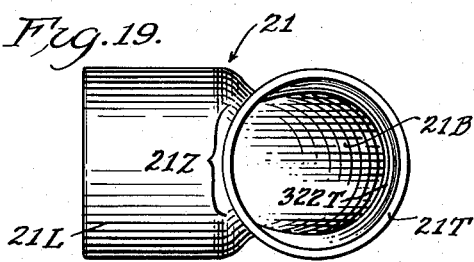
Fig. 19.
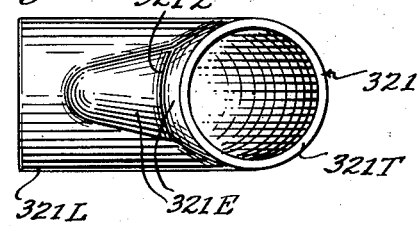
Fig. 20.
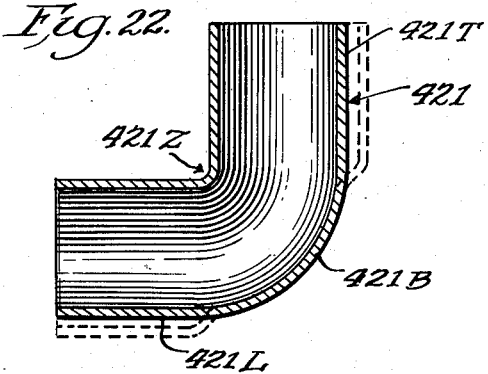
Fig. 22.
Fig. 23.
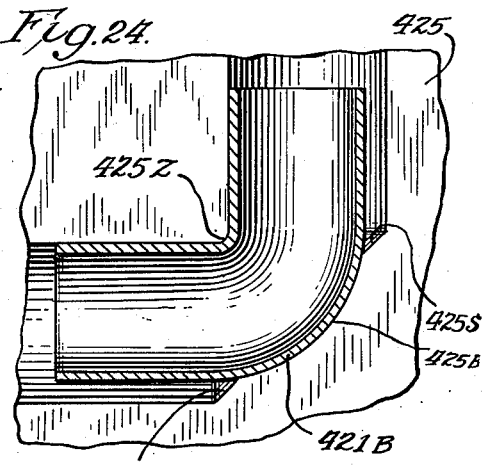
Fig. 24.
Inventor
Walter L. Veatch
By Mann, Brown and Hanemann
Attys.

United States Patent Office 2,952,070
Patented Sept. 13, 1960

2,952,070
WROUGHT FITTING AND METHOD OF MAKING

Walter L. Veatch, 1444 Strong Ave., Elkhart, Ind.

Filed July 1, 1955, Ser. No. 519,356

5 Claims. (Cl. 29—157)

This invention relates to wrought metal fittings such as T's, crosses, elbows, Y's and the like and to methods of making the same.

Fittings of the aforesaid character are utilized for connecting a number of receivable members such as metal tubes and the like, and each fitting comprises a plurality of receiving cups joined in the proper angular relationship by an intermediate body so that when the ends of the receivables are fixed in the receiving cups these receivables are effectually interconnected.

In such wrought metal fittings, the "laying length" of the fitting is defined as the distance from the end of receivable member to the center line of the fitting, and as heretofore made, it has been the desire, unattainable in the prior art, to reduce the laying lengths of such fitting to the absolute minimum. This minimum length is desirable in order to provide greater strength in the fitting, to reduce the material content of the fitting and to improve the installation characteristics of the fitting.

In the manufacture of such fittings, with the known methods used in the industry, the laying length must be controlled by the body element that connects the cups at the inside corner of the fitting. In the case of fittings with expanded cups, the present practice and known method in the industry is to preform the cup elements of the fitting to a true circular diameter equal to the diameter of the body of the fitting, and therefore, the radii that connect the cup elements must be tangent to the true body diameter of the fitting. The subsequent forming operation of moving forming punches inward, to expand the cups and to create the internal stop shoulders that define the laying length, must be controlled to stop their inward movement at a point where the leading expanding element of the forming punch does not disturb the radii elements that connect the cups. Any movement of the punches beyond this point creates a fold in the metal at the inside corner of the fitting, and such a fold tends thereafter to become a basis for fatigue cracking, thereby, making the fitting of inferior quality, or unusable. As the leading end of the forming punch serves to create the laying length, then the laying length of the fitting must be something greater than the minimum.

In the case of fittings with laying lengths created by rolling a groove around the periphery of the fitting, thereby, forming an internal abutment which creates or defines the laying length, the groove must be rolled at a point where it does not disturb the radii elements that connect the cups, and this creates a laying length that is greater than the minimum.

A study of the American Standard—"Wrought Copper and Wrought Bronze Solder Joint Fittings"—A.S.A.—16. 22–1951, reveals the distressing problem of laying lengths to all manufacturers of wrought fittings, particularly in paragraph 7.1 of the Standard, which states, "The dimensions for laying lengths (Fig. 1) cannot be established, due to present manufacturing practices not being in agreement and the processes employed. Consult the manufacturer for these dimensions."

Thus, in such wrought metal fittings as heretofore made, the attainment of the requisite strength in the fitting has made it necessary to employ a relatively large intermediate body, thus to space the receiving cups so as to objectionably increase the laying length dimensions and at the same time require a relatively large amount of material in making the fitting.

With the foregoing in mind, it is the primary object of this invention to provide wrought fittings that are of a smaller size than has heretofore been required, and a related object is to enable wrought fittings having predetermined strength characteristics to be produced with less metal than has been required in prior fittings. Further and more specific objects of the invention are to associate the receiving cups of such a fitting through the use of an integral connecting body of minimum size or dimensions; to enable the laying length dimensions of such fittings to be materially reduced as compared with prior fittings; and to prevent disturbance of the metal in the critical zones or areas of such fittings during the final forming operations so as to assure the requisite strength in the completed fittings.

Other and further objects of the present invention will be apparent from the following description and claims, and are illustrated in the accompanying drawings, which, by way of illustration, show preferred embodiments of the present invention and the principles thereof, and what I now consider to be the best mode in which I have contemplated applying these principles. Other embodiments of the invention embodying the same or equivalent principles may be used and structural changes may be made as desired by those skilled in the art without departing from the invention.

In the drawings:

Fig. 1 is a side elevation view of a T fitting embodying the invention;

Fig. 2 is a plan view thereof;

Fig. 3 is a vertical sectional view taken longitudinally of the fitting along the line 3—3 of Fig. 2;

Fig. 4 is a vertical sectional view taken along the line 4—4 of Fig. 2;

Fig. 5 is a view similar to Fig. 3 and showing the intermediate blank from which the fittings of Figs. 1 to 4 is produced;

Fig. 6 is a vertical sectional view taken substantially along the line 6—6 of Fig. 5;

Fig. 7 is a horizontal view taken substantially along the line 7—7 of Fig. 5;

Fig. 8 is a vertical sectional view taken substantially along the line of 8—8 of Fig. 5;

Fig. 9 is a view taken in vertical section and showing the intermediate blank in position in the final forming dies;

Fig. 10 is a vertical sectional view taken in substantially along the line of 10—10 of Fig. 9;

Fig. 11 is a view similar to Fig. 9 showing the forming mandrels or punches in their final forming positions;

Fig. 12 is a plan view of a different form of intermediate blank;

Fig. 13 is a vertical cross sectional view taken substantially along the line 13—13 of Fig. 12;

Fig. 14 is a view showing the end of the blank illustrated in Figs. 12 and 13;

Fig. 15 is a view similar to Fig. 13 and showing the intermediate blank of Figs. 12 to 14 in position in the forming dies;

Figs. 16 and 17 are vertical sectional views taken respectively along the lines 16—16 and 17—17 of Fig. 15;

Figs. 18 and 19 are views illustrating an elbow embodying the features of the invention;

Fig. 20 is a plan view of one form of blank from which the elbow of Figs. 18 and 19 may be produced;

Fig. 21 is a vertical sectional view showing the blank of Fig. 20 in position in the final forming die;

Fig. 22 is a vertical sectional view of another form of intermediate blank that may be used in making the elbow of Figs. 18 and 19;

Fig. 23 is a plan view of the intermediate blank shown in Fig. 22; and

Fig. 24 is a view illustrating the blank of Figs. 22 and 23 in position in the final forming die.

For purposes of disclosure the present invention is disclosed in Figs. 1 to 3, as embodied in T fitting 20, and in Figs. 18 and 19 as embodied in an elbow fitting 21, and as will be described hereinafter, two different but basically related methods of producing such fittings under the invention are illustrated in other views of the drawings.

The T fitting 20 as shown in Figs. 1 to 4 comprises a pair of aligned oppositely facing cylindrical receiving cups 20R and 20L and a laterally extending cylindrical receiving cup 20T, these receiving cups being integrally connected by an intermediate body 20B, and under and in accordance with the present invention the several receiving cups are so positioned and related that adjacent receiving cups are directly connected to each other in adjacent arcuate zones 20Z along their inner ends, thus to minimize the dimensions and amount of material required in the body 20B.

The several receiving cups 20R, 20L and 20T have inner diameters substantially complemental to the outer diameters of the receivable members such as tubes that are to be inserted thereinto, and as herein shown all of the receiving cups are of the same diameter, although the invention is equally applicable to fittings where different diameters of receiving cups are employed in a single fitting. The inner ends of the several cups 20R, 20L and 20T are defined by abutment shoulders 22 that face outwardly of the respective cups in position to be engaged by the ends of receivable members as they are inserted into the respective cups, and the spacing of these abutments of the several receiving cups from the intersection of the center lines of the cups serve to define what are called the laying length dimensions of the fittings. The several abutment shoulders 22 are formed as offsets in the walls of the fitting and particularly in the walls of the intermediate body 20B, and these offsets may be termed transition portions or sections of the fitting. Under the present invention the abutment means at the bottom of each receiving cup are discontinuous in the sense that the abutment means are discontinued or eliminated in those areas that are adjacent to the arcuate zones 20Z where the receiving cups are directly joined or connected.

Thus, as shown in Figs. 1 to 4 of the drawings, the walls of the intermediate body 20B are, in effect, offset inwardly with respect to the adjacent receiving cups at all points except the zones 20Z, and this results in a somewhat different arrangement and extent of the abutment shoulders 22 in different receiving cups, depending on the number and disposition of the arcuate zones 20Z that are related or joined to each individual receiving cup. As applied to the three receiving cups embodied in the T fitting 20 of Figs. 1 to 4, it will be evident that the cups 20L and 20R are similar although reversed in relation and each such cup is related or connected to but one arcuate zone 20Z, while the cup 20T is related or connected to two such arcuate zones 20Z, and hence the abutment shoulders 22 of the receiving cup 20T are dfferent from the shoulders 22 of the receiving cups 20R and 20L, as will now be described.

Thus, with respect to the receiving cup 20T, the intermediate body 20B has extension walls 20W that connect with the inner end of the cup 20T and are, throughout a portion of their extent, spaced apart a distance less than the diameter of the cup 20T, as shown particularly in Fig. 4 of the drawings. The extension walls 20W are, however, formed so that they merge smoothly with the arcuate zones 20Z, and thus as these extension walls 20W approach the zones 20Z the diametric distance between such walls 20W increases to some extent. Adjacent the inner end of the cup 20T the extension walls 20W are offset outwardly to the diameter of the cup 20T, thus to form the shoulders 22 for the cup 20T and by reason of the way in which the walls 20W are formed and spaced from each other, this outward offset of the walls 20W affords two arcuately extending shoulders 22—1 and 22—2 disposed on opposite sides of the cup 20T and located intermediate and in spaced relation to the two arcuate zones 20Z.

In respect to the receiving cups 20R and 20L, the respective shoulders are identified as 22R and 22L, and these shoulders extend throughout most of the circumference of the cup but are discontinued in spaced relation to the opposite ends of the arcuate zone 22Z in each instance, as will be evident in Figs. 3 and 4 of the drawings.

The direct coupling or connection of adjacent receiving cups of the fitting in short arcuate zones 20Z, together with the employment of discontinuous stop shoulders 22 in defining the inner ends of the receiving cups, enables the intermediate body 20B of the fitting to be minimized in size and weight, and it has been discovered that these characteristics of form and relation enable the broad fundamentals of known and highly efficient processes of metal forming to be utilized in novel manner to produce the fittings. The novel application of such known metal working processes constitute the method aspects of the present invention, and the first application of the novel method will now be described as applied to the T fitting 20 of Figs. 1 to 4.

The known process hereinabove mentioned is disclosed in Parker Patent No. 2,027,285, patented January 7, 1936, and others, and as taught for example by such patent, and as practiced in the industry for many years, metal tubing is utilized as the starting material for forming fittings such as T's, crosses and the like. Under such prior process, a short section of seamless metal tubing is filled with a low melting point metal, and is placed in a die that snugly embraces most of the outer area of the tubing section but which has at least one laterally extended die cavity opposite intermediate portion of the tubing section. Then, by applying pressure to the opposite ends of the tubing section and the incompressible filler material, the metal of the tubing section is subjected to a drawing action that forms a lateral projection or branch extending from the main body of the tubing section into the lateral die cavity. The filler metal is then removed by melting and draining as described in the aforesaid Parker patent, and the end of the hollow lateral extension is cut off, thus to afford an intermediate product in the general form of the fitting that is to be produced, and by further working of this intermediate product, the final fittings of the prior art have been produced.

As hereinabove pointed out, prior fittings made by the processes such as that taught in the aforesaid Parker patent and others have been relatively large, but by the methods of the present invention, fittings of adequate strength and smaller size and weight may be made by utilizing the well known broad principles of the Parker patent in a new and advantageous manner. Thus, in the prior uses of processes such as that of the Parker Patent, the lateral extensions could be formed on the tubing section so that, at the line of intersection of the extension with the tube section, relatively short radius bends of adequate strength were afforded in the critical zones of such line of intersection. Such critical zones along the line of intersection or joinder occur only where the angle between the joined walls is relatively small; and to further illustrate this characteristic in may be observed that in a T fitting such angle varies between 90° and 180° and there are two points where the angle of intersection between the joined walls reaches the minimum of 90°. Thus, in the arcuate zones on both sides of these minimum points, the angle between the joined walls is relatively close to such minimum, and it is within such zones that the maximum working of the metal has taken place in the initial forming operation above described. Under such prior procedures, relatively short radius bends could be attained in these critical arcuate zones, but due to the amount of working exerted on the metal in making such short radius bends in these critical zones, prior workers in the art have long considered it to be essential that the receiving cups of the fitting be subsequently formed in a substantially spaced relation to these critical zones, thus to require a relatively large and heavy intermediate body between the cups of the fitting.

Under the present invention, however, it has been found that such a large intermediate body is unnecessary, and the size of the intermediate body of the fitting may be reduced to its minimum, thereby to so relate adjacent receiving cups so that adjacent portions of the inner ends of their side walls are directly connected one to the other. This is accomplished under the method aspects of the present invention by utilizing, in a modified and improved manner, the broad metal working principles long known in the art.

Thus, under the present invention the initial forming operations are employed to impart a special and novel form to the intermediate product and this special form in the intermediate product is so coordinated with the final form of the fitting that in the subsequent forming operations the metal in the critical zones above described remains practically undisturbed. This results in a fitting such as that shown in Figs. 1 to 4 wherein the intermediate body is minimized as to size and weight and yet the requisite strength in the fitting is afforded.

Such special form of the intermediate product may be varied to some extent as will be evident from a consideration and comparison of the intermediate products shown respectively in Figs. 5 to 8 and in Figs. 12 to 14; and in arriving at the particular special form that is to be thus embodied in the intermediate product the primary consideration is that the critical short radius zones be so related to the final form of the fitting that there will be no appreciable disturbance or working of the metal in these bends or zones during the final forming operations, and as a secondary consideration, that the open ends of the tube section and the lateral extension be so formed as to cooperate efficiently with the forming punches used in such final forming operations.

In the intermediate product shown in Figs. 5 to 7 this is attained by forming the tube section to provide aligned end portions 120R and 120L that are joined by an intermediate body portion 120B to a lateral extension 120T, and at their outer ends all of these portions are cylindrical in form. Spaced inwardly from such outer ends, a special formation or enlargement 120E is provided in each of the walls of these portions adjacent the arcuate zones 120Z where the inner ends of the portions 120R, 120L and 120T join each other. Such enlargements 120E become progressively smaller and somewhat narrower as they extend away from their arcuate juncture zones 120Z, as will be evident in Figs. 5 to 8, and such enlargements serve to impart a non-circular and substantially ovoid cross sectional form to the arms or branches of the intermediate product adjacent to the juncture zones 120Z. The enlargements 120E are so sized and proportioned that the arcuate juncture zones 120Z substantially correspond to the size, location and extent of the arcuate zones 20Z of the completed fitting, and in the subsequent final forming operations, the enlargement of the several arms of the structure is carried out in such a way that the metal in the arcuate zones 20Z remains substantially undisturbed.

In such final forming operation the intermediate product of Figs. 5 to 8 is mounted as shown in Fig. 9 in a separable die 25 which when closed has internal surfaces or die cavities that are complemental to the external surfaces of the fitting 20 that is to be formed. Thus the intermediate product is initially engaged and positioned within the die 25 by die surfaces 25B that contact the intermediate body 120B up to substantially the lower edges of the connecting wall 20W and by arcuate surfaces 25Z that engage the zones 120Z. When the intermediate product 120 is thus positioned the ends of the several branches are expanded to form the receiving cups and abutment shoulders 22, and this is accomplished by forming punches or mandrels 26T, 26L and 26R that are forced into the respective ends of the branches 120T, 120L and 120R. The result of this final forming operation is illustrated in Fig. 11 of the drawings. The forming mandrels have tapered inner ends so as to facilitate their initial entry into the branches that are to be expanded thereby, and the respective mandrels are disposed on axes that are substantially concentric with the inner surfaces of the related zones 120Z, and hence as the tapered ends of these mandrels enter the circular outer ends of the several branches the tapered surfaces engage these open ends in a uniform or balanced manner and initiate the expansion of these branches. As the inward stroke of a mandrel progresses, the lateral enlarging action thereof is substantially uniform about the periphery of the engaged branch, but when the end of the mandrel reaches the related enlargement 120E, the expansion or enlarging action in the area of the enlargement 120E becomes progressively less and less until at the inner end of the mandrel stroke there is no appreciable enlarging action or metal working action directly adjacent or in the zone 120Z.

At the ends of their inward strokes, the beveled end edges of the mandrels cooperate with shoulders 122 in the die 25 to form the discontinuous internal abutment end shoulders 22 that define the inner ends of the respective receiving cups.

The fitting 20 may also be made through the use of a slightly different form of intermediate body 220 as illustrated on Figs. 12 to 17 of the drawings. Thus the body 220 is formed to provide branches 220R, 220L and 220T joined by an intermediate body 220B, and the zones of short radius connection between the several branches are identified as arcuate zones 220Z. In order that the zones 220Z may be disposed so that they will not be disturbed or worked in the final forming operations, the several branches are made of a somewhat oval cross sectional form with their major transverse axes disposed in a plane passing through the longitudinal axes of the three branches. The several branches are thus in effect enlarged at or in the regions of the several arcuate zones 220Z.

In the final forming of the intermediate product 220 a final forming die 225 is employed that is basically the same as the die 25, but which is slightly modified in respect to the surfaces that are to engage the body 220B. Thus, since the body 220B is of slightly oval form, a similar but complemental form is provided in the surfaces 225B that engage the body 220B. Since the several branches of the product 220 are of uniform cross section throughout their length, these branches engage the die cavity only in those longitudinal portions that are aligned with the zones 220Z, as will be evident in Figs. 15 to 17. Thus when the mandrels 226 are forced into the ends of the several branches, these branches are expanded to form the receiving cups and this is accomplshed without disturbing or working the metal in the critical zones 220Z. The resulting fitting is substantially like that shown in Figs. 1 to 4 with the exception that the intermediate body thereof retains certain of its slightly oval characteristics that have been described hereinabove.

As hereinabove described, the invention has been embodied in wrought metal T's formed by two generally similar methods of manufacture, and these two methods may be applied with equal facility to other forms of fittings such, for example, as Y's, crosses and elbows. Thus, as shown in Figs. 18 and 19 of the drawings, the elbow 21 is formed with two receiving cups 21T and 21L that are joined together by an integral intermediate body 21B. In the form herein shown the elbow has the receiving cups disposed at an angle of 90° with respect to each other, but it will be recognized that this angle may be varied in accordance with conventional requirements. The two receiving cups 21L and 21T are so disposed that at the sharp included angle between the ends of these cups are directly joined one to the other throughout a relatively short arcuate zone 21Z that corresponds to the zone 20Z described hereinabove. The inner ends of the respective cups are afforded by outwardly facing shoulders that are similar in character and the shoulder is illustrated in detail in respect to the cup 21T, this shoulder being identified as shoulder 322T. These shoulders are discontinuous, and are of the same form and relationship as the shoulders 21R and 22L hereinbefore described. Thus, these shoulders terminate in spaced relation to the zone 21Z as will be evident in Fig. 19 of the drawings.

The fitting 21, as illustrated in Figs. 18 and 19, may be advantageously produced under either of the two broad methods hereinbefore described, the first of such methods being illustrated in Figs. 20 and 21 while the second of these methods is illustrated in respect to the elbow structure in Figs. 22 to 24. Thus, with respect to the first of these two methods it may be noted that a blank 321 is formed from an elongated deep drawn closed end tube by known methods so as to embody enlargements 321E that are similar in form and position to the enlargements 120E hereinbefore described. These enlargements 321E are of course formed in the opposite end portions 321L and 321T of the blank, and the extreme ends of the portions 321L and 321T are cylindrical in form. The two enlargements 321E are arranged to meet in an arcuate zone 321Z, and thus when the blank 321 is put into the forming die 325, the body portion 321B of the blank is supported on appropriate internal die surfaces 325B, and the zone 321Z is engaged by an arcuate internal die surface 325Z in much the same manner as hereinbefore described in respect to the structure shown in Figs. 9 and 10 of the drawings. Similar forming mandrels or plungers are then forced into the ends of the arms 321L and 321T so as to enlarge these arms without disturbing the metal at the arcuate zones 321Z. These plungers enlarge the arms 321L and 321T and form the metal thereof against shoulders 325S of the die, thus to provide the internal shoulders that define the inner ends of the respective receiving cups of the elbow.

In Figs. 22 to 24 a different form of blank 421 is provided, and this blank is made in accordance with the broad principles hereinbefore described in respect to Figs. 12 to 17 of the drawings. In other words the blank 421 has arms 421T and 421L that are oval in cross section as will be evident in Fig. 23 of the drawings, and these arms or branches are joined by a body section 421B that also is basically oval in its transverse cross sectional form. These oval portions meet in an arcuate zone 421Z that is positioned in a location that corresponds in position with the arcuate zone 21Z that is to be provided in the final form of the fitting. The blank 421 is positioned in a forming die 425 where it is supported and engaged by die surfaces 425B and 425Z, and forming mandrels or punches are thereafter forced into the open ends of the arms 421T and 421L so as to enlarge these arms in the same general manner as hereinbefore described with respect to Figs. 15 to 17 of the drawings. This forces the metal of the fitting against die shoulders 425S, thus to form the internal outwardly facing shoulders such as the shoulder 322T of Fig. 19. In this forming operation, of course, the metal in the arcuate zone 421Z is not disturbed, and hence the strength of the metal in this critical zone is maintained and proper strength is afforded in the completed structure.

In my invention of a wrought fitting the strength factor is improved in two ways. First, in regard to the stresses created in the fitting by misalignment and vibration of the system in which it is used. As the ends of the receivable members are substantially adjoining, the distance from the ends of the receivable members to the intersecting center lines of the fitting is considerably less than the distance from the tangent point where the cup element and the connecting radii element join, thereby causing the connecting radii element to act as a brace against stresses, rather than as a concentration point of stresses as is true in the present wrought fittings.

Second, the strength of the fitting as exposed to the internal pressure of the systems in which it is used is considerably improved because the internal exposed area is the smallest possible obtainable, considerably smaller than fittings of present manufacture. Therefore, as the internal exposed area of the fitting is the smallest possible obtainable, the stresses created by a given system pressure will be less than in fittings with a greater internal exposed area that are subjected to the same given system pressure.

The new type wrought fitting provides a material saving of from 30% to 48% through the range of sizes normally produced. As an example, it is known that but twelve ½" T's of conventional design may be produced from one pound of material, while in contrast to this, with ½" T's of the present invention, twenty pieces are produced from a pound of material.

Regarding the installation characteristics, the trade has always desired a wrought fitting having a laying length as small as or less than the laying length of comparable cast fittings. The new wrought fitting will now give the trade the fitting it wants.

From the foregoing description it will be evident that the present invention enables wrought metal fittings to be materially improved in many respects and particularly that it enables a smaller size to be maintained so as to facilitate installation and reduce the manufacturing cost, and further that the minimum size or dimension of the connecting body of the improved fitting enables the fitting to better withstand mechanical stresses and vibrations as well as stresses impressed thereon by internal system pressure. The present invention also reduces the laying length that is required in fittings of this character and thus meets a need that has long been present in the field of wrought metal fittings.

Thus, while I have illustrated and described several preferred embodiments of the present invention and several methods for forming or making the fittings of this invention, it is to be recognized that these may be modified and varied by those skilled in the art without departing from the spirit and scope of the invention.

I claim:

1. The method of making a thin walled wrought metal fitting having straight angularly extending cylindrical receiving cups which comprises substantially filling a section of metal tubing with an incompressible pressure-applying material, placing the substantially filled tubing section within a die cavity complemental to a fitting blank to be formed, applying pressure to said material to expand the tubing section with a drawing action within the die cavity to form a fitting blank conformed to the die cavity and having walls defining a hollow body with hollow extensions corresponding substantially with the final location of said cups and with the sharp angle junctions of said extensions defined by short radius corner portions in a limited arcuate zone located at the positions to be occupied by the sharp angle junctions of the receiving cups, placing the intermediate blank in a split die having internal surfaces that initially engage the intermediate blank along an intermediate body portion and having shoulders formed thereon at the locations to be occupied by the bottoms of the receiving cups and which has internal surfaces that initially engage said arcuate zones where the angle of intersection between the walls of the finished fitting is to be the smallest so that such intermediate body portions and said arcuate zones will not be worked or disturbed in the final forming operations, the other internal surfaces of said split die being spaced from the end portions of the blank so that such end portions are free to expand radially outwardly to form the cylindrical receiving cups, introducing mandrels into said outer end portions concentric said arcuate zones and with the locations to be occupied by the cylindrical receiving cups with such mandrels having a cylindrical outer form with tapered inner ends so that the introduction of said mandrels expands the end portions of the intermediate blank radially outwardly to form the cylindrical receiving cups and the beveled edges of the mandrels cooperate with said shoulders to form discontinuous abutment shoulders defining the inner ends of said cups and disposed substantially in the planes of the respective arcuate zones.

2. The method of making a wrought metal fitting having straight angularly extending cylindrical receiving cups which comprises substantially filling a section of metal tubing with an incompressible pressure-applying material, placing the substantially filled tubing section within a die cavity complemental to a fitting blank to be formed, applying pressure to said material to expand the tubing section with a drawing action within the die cavity to form a fitting blank conformed to the die cavity and having walls defining a hollow body with hollow extensions corresponding substantially with the final location of said cups and with the sharp angle junctions of said extensions defined by short radius corner portions in a limited arcuate zone located at the positions to be occupied by the sharp angle junction of the receiving cups, placing the intermediate blank in a split die having internal surfaces that initially engage the intermediate blank along an intermediate body portion and having shoulders formed thereon at the locations to be occupied by the bottoms of the receiving cups and which has internal surfaces that initially engage said arcuate zones where the angle of intersection between the walls of the finished fitting is to be the smallest so that such intermediate body portions and said arcuate zones will not be worked or disturbed in the final forming operations, the other internal surfaces of said split die being spaced from the end portions of the blank so that such end portions are free to expand radially outwardly to form the cylindrical receiving cups, introducing mandrels into said outer end portions concentric said arcuate zones and with the locations to be occupied by the cylindrical receiving cups with such mandrels having a cylindrical outer form with tapered inner ends so that the introduction of said mandrels expands the end portions of the intermediate blank radially outwardly to form the cylindrical receiving cups and the beveled edges of the mandrels cooperate with said shoulders to form discontinuous abutment shoulders defining the inner ends of such cups and disposed in planes that are substantially tangent to the respective arcuate zones.

3. The method of making a wrought metal fitting with angularly related cylindrical receiving cups joined by an intermediate integral body portion, said method comprising substantially filling a section of metal tubing with an incompressible pressure-applying material, placing the substantially filled tubing section within a die cavity complemental to a fitting blank to be formed, applying pressure to said material to expand the tubing section with a drawing action with the die cavity to form a fitting blank conformed to the die cavity and having walls defining a hollow body portion with hollow extensions extending from said body portion in substantially the positions to be occupied by said receiving cups and with said extensions distended laterally adjacent the arcuate zones where the angle of intersection between such walls is the smallest and with said walls in said arcuate zones being joined by short radius bends, placing the intermediate blank in a split die having internal surfaces that initially engage the intermediate blank along an intermediate body portion and having shoulders formed thereon at the locations to be occupied by the bottoms of the receiving cups and said die having internal surfaces which engage said arcuate zones where the angle of intersection between the walls is to be the smallest so that such intermediate body portions and said arcuate zones will not be worked or disturbed in the final forming operations, the portions of said split die being spaced from the end portions of the blank so that such end portions are free to expand radially outwardly to form the cylindrical receiving cups, introducing mandrels into said outer end portions concentric with the loctions to be occupied by the cylindrical receiving cups and also concentric with the arcuate zones and with such mandrels having a cylindrical outer form with tapered inner ends so that the introduction of said mandrels expand the end portions of the blank radially outwardly to form the cylindrical receiving cups centered substantially on the respective arcuate zones and the beveled edges of the mandrels cooperate with said shoulders to form discontinuous abutment shoulders that define inner ends of said receiving cups.

4. The method of making a wrought metal fitting with angularly related cylindrical receiving cups joined by an intermediate integral body portion, said method comprising substantially filling a section of metal tubing with an incompressible pressure-applying material, placing the substantially filled tubing section within a die cavity complemental to a fitting blank to be formed, applying pressure to said material to expand the tubing section with a drawing action with the die cavity to form a fitting blank conformed to the die cavity and having walls defining from said body portion with hollow extensions extending from said body portion in substantially the positions to be occupied by said receiving cups and with said extensions distended laterally adjacent the arcuate zones where the angle of intersection between such walls is the smallest and with said walls in said arcuate zones being joined by short radius bends, placing the intermediate blank in a split die having internal surfaces that initially engage the intermediate blank along an intermediate body portion and having shoulders formed thereon at the locations to be occupied by the bottoms of the receiving cups and said die having internal surfaces which engage said arcuate zones where the angle of intersection between the walls is to be the smallest so that such intermediate body portions and said arcuate zones will not be worked or disturbed in the final forming operations, the portions of said split die being spaced from the end portions of the blank so that such end portions are free to expand radially outwardly to form the cylindrical receiving cups, introducing mandrels into said outer end portions concentric with the locations to be occupied by the cylindrical receiving cups and also concentric with the arcuate zones and with such mandrels having a cylindrical outer form with tapered inner ends so that the introduction of said mandrels expand the end portions of the blank radially outwardly to form the cylindrical receiving cups centered substantially on the respective arcuate zones and the beveled edges of the mandrels cooperate with said shoulders to form discontinuous abutment shoulders that define inner ends of said receiving cups in each of which the longitudinally extending portions of the side walls that are adjacent one of said arcuate zones meets such arcuate zone and is directly connected by a short radius bend in such zone to another such longitudinally extending portion of the side walls of an adjacent cup.

5. The method of making a thin walled wrought metal fitting having straight angularly extending cylindrical receiving cups which comprises placing a section of metal tubing in a die cavity complemental to a fitting blank to be formed, applying pressure to the material of the tubing to laterally expand the tubing with a drawing action within the die cavity to form a fitting blank conformed to the die cavity and having walls defining a hollow body with hollow extensions corresponding substantially with the final location of said cups and with the sharp angle junctions of said extensions defined by short radius corner portions in a limited arcuate zone located at the positions to be occupied by the sharp angle junctions of the receiving cups, placing the intermediate blank in a split die having internal surfaces that initially engage the intermediate blank along an intermediate body portion and having shoulders formed thereon at the locations to be occupied by the bottoms of the receiving cups and which has internal surfaces that initially engage said arcuate zones where the angle of intersection between the walls of the finished fitting is to be smallest so that such intermediate body portions and said arcuate zones will not be worked or disturbed in the final forming operations, the other internal surfaces of said split die being spaced from the end portions of the blank so that such end portions are free to expand radially outwardly to form the cylindrical receiving cups, introducing mandrels into said outer end portions concentric said arcuate zones and with the locations to be occupied by the cylindrical receiving cups with such mandrels having a cylindrical outer form with tapered inner ends so that the introduction of said mandrels expands the end portions of the intermediate blank radially outwardly to form the cylindrical receiving cups and the beveled edges of the mandrels cooperate with said shoulders to thereby form discontinuous abutment shoulders defining the inner ends of said cups and disposed substantially in the planes of but with the shoulders displaced circumferentially from the respective arcuate zones.

References Cited in the file of this patent

UNITED STATES PATENTS

| | | |
|---|---|---|
| 1,277,982 | Matte | Sept. 3, 1918 |
| 1,850,049 | Cornell | Mar. 15, 1932 |
| 1,921,584 | Robinson | Aug. 8, 1933 |
| 1,933,710 | Cornell | Nov. 7, 1933 |
| 1,964,474 | Lindquist | June 26, 1934 |
| 2,027,285 | Parker | Jan. 7, 1936 |
| 2,039,542 | Lindquist | May 5, 1936 |
| 2,206,741 | Cornell | July 2, 1940 |
| 2,243,809 | Wendell | May 27, 1941 |
| 2,735,389 | Wurzburger | Feb. 21, 1956 |

FOREIGN PATENTS

| | | |
|---|---|---|
| 427,633 | Great Britain | Apr. 23, 1935 |